United States Patent
Yurchak et al.

[11] 3,879,489
[45] Apr. 22, 1975

[54] ISOPARAFFIN-OLEFIN ALKYLATION WITH A CATALYST COMPLEX OF A CATION EXCHANGE RESIN, BF₃ AND HF

[75] Inventors: Sergei Yurchak, Washington Crossing, Pa.; Joseph N. Miale, Trenton, N.J.

[73] Assignee: Mobil Oil Corporation, New York, N.Y.

[22] Filed: Apr. 5, 1974

[21] Appl. No.: 458,362

[52] U.S. Cl.................... 260/683.44; 260/683.51
[51] Int. Cl............................................. C07c 3/52
[58] Field of Search...... 260/683.51, 683.47, 683.44

[56] References Cited
UNITED STATES PATENTS

| | | | |
|---|---|---|---|
| 2,405,993 | 8/1946 | Burk | 260/683.44 |
| 2,843,642 | 7/1958 | Kelly | 260/683.44 |

FOREIGN PATENTS OR APPLICATIONS

| | | | |
|---|---|---|---|
| 733,753 | 7/1955 | United Kingdom | 260/683.43 |

*Primary Examiner*—Delbert Gantz
*Assistant Examiner*—G. J. Crasanakis
*Attorney, Agent, or Firm*—Charles A. Huggett; Raymond W. Barclay

[57] ABSTRACT

This invention relates to a process for effecting alkylation of an isoparaffin with an olefin in the presence of a catalyst comprising a macroreticular acid cation exchange resin characterized by a surface acid concentration of less than about 0.5 milliequivalents of hydrogen ion per square meter surface area, boron trifluoride in an amount of at least about 0.1 equivalent per equivalent of resin acid groups but not in excess of that required to saturate said resin and hydrogen fluoride in an amount between about 0.1 equivalent and about 10 equivalents per equivalent of resin acid groups.

10 Claims, 1 Drawing Figure

3,879,489

ISOPARAFFIN-OLEFIN ALKYLATION WITH A CATALYST COMPLEX OF A CATION EXCHANGE RESIN, BF₃ AND HF

BACKGROUND OF THE INVENTION

1. Field of the Invention

This invention pertains to a process for alkylation by reaction of an isoparaffin and an olefin.

2. Description of the Prior Art

Alkylation achieved as a result of reaction between an isoparaffin and an olefin has heretofore been recognized as resulting in an alkylate product useful as a high octane blending stock in gasoline.

Sulfuric acid and HF alkylation processes have been used for the production of such alkylate. These processes employ liquid-liquid catalytic systems which are known to be expensive and troublesome because of such problems as maintaining an acid/hydrocarbon emulsion, product separation and waste disposal.

In order to overcome such problems, attempts have been made in the past to conduct the desired alkylation in a heterogeneous catalyst system. One such attempt described in U.S. Pat. No. 3,251,902 has involved the use of crystalline aluminosilicate zeolites as catalysts. While certain of such crystalline aluminosilicate zeolites have been found to be effective catalysts for isoparaffin/olefin alkylation, they have the disadvantage of aging rapidly and requiring frequent regeneration to maintain requisite selectivity.

Another approach which has been suggested in the past is the use as a catalyst for effecting the desired isoparaffin/olefin alkylation of a complex of a microreticular or gel type ion exchange resin and boron trifuloride. The use of such complex, although suggested almost twenty years ago, see for example U.S. Pat. No. 2,843,642, has not been adopted on a commercial scale due to side formation of unwanted olefinic products and relatively low selectivity for the desired branched alkylate product.

BRIEF DESCRIPTION OF DRAWINGS

The invention is described in conjunction with the accompanying drawing in which.

SUMMARY OF THE INVENTION

Figure 1:
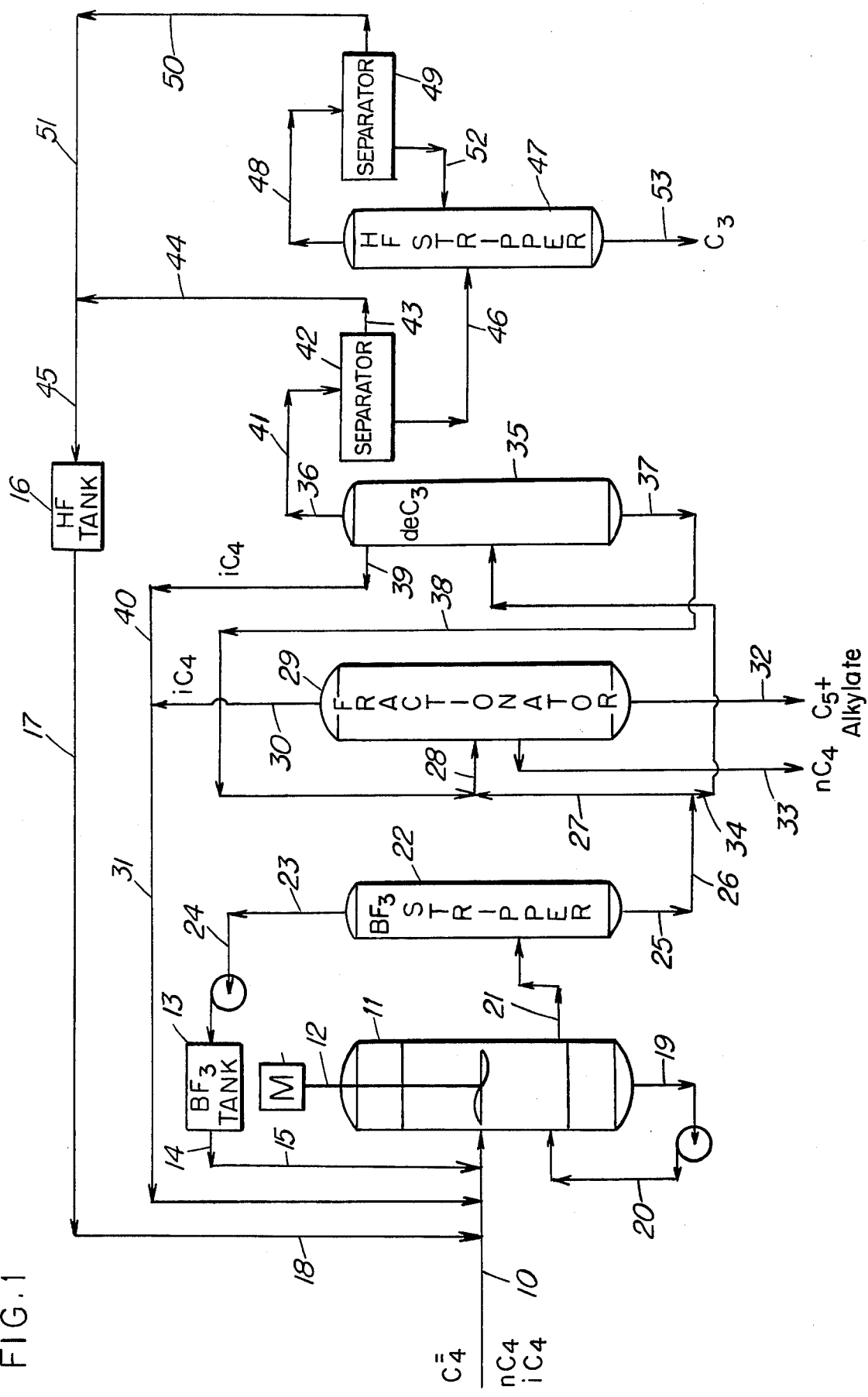
FIG. 1 illustrates a continuous mode of operation.

In accordance with the present invention, there is provided an isoparaffin/olefin alkylation process which overcomes many of the disadvantages of those previously employed and/or suggested. The method described herein, in contrast to that of U.S. Pat. No. 2,843,642, utilizes a catalyst which is a complex of a macroreticular acid cation exchange resin, boron trifluoride and hydrogen fluoride. The particular class of macroreticular acid cation exchange resins employed are characterized by substantial porosity, high surface area and a low surface acid concentration, generally less than about 0.5 milliequivalents of hydrogen ion per square meter surface area. For effecting the desired alkylation, the cation exchange resin should contain a small amount of water, generally between 0.5 and 20 percent by weight. The requisite amount of boron trifluoride contained in the catalyst is at least about 0.1 equivalent per equivalent of resin acid groups but not in excess of that required to saturate said resin and the requisite amount of hydrogen fluoride between about 0.1 and about 10 equivalents per equivalent of resin acid groups. The use of such catalyst has been found to unexpectedly result in an attractive yield of alkylate product of high octane number.

The macroreticular resins utilized in the process of this invention are characterized by the presence of acid functional groups and a structure having a high degree of true porosity while possessing rigidity and being subject to minimum volume change when immersed or removed from solvents or solutions.

The macroreticular acid ion exchange resin employed is typified by the presence of sulfonic acid groups, e.g., the sulfonated styrene-divinylbenzene copolymer exchange resins such as those commercially available as Amberlyst-15, Amberlyst XN-1005, Amberlyst XN-1010, Amberlyst XN-1011, Amberlyst XN-1008 and Amberlite 200. The properties of these resins, along with Amberlite IR-120H, a typical microreticular resin and Amberlite XAD-4 a styrene-divinylbenzene copolymer with no ion exchange capacity are shown below:

| | Macroreticular | | | |
|---|---|---|---|---|
| | Amberlyst-15 | Amberlyst-XN-1005 | Amberlyst XN-1010 | Amberlyst XN-1011 |
| Skeletal Structure | Styrene-DVB | Styrene-DVB | Styrene-DVB | Styrene-DVB |
| Ionic Functionality | $RSO_3H$ | $RSO_3H$ | $RSO_3H$ | $RSO_3H$ |
| Hydrogen Ion Concentration meq/g dry (Exchange Capacity) | 4.9 | 3.4 | 3.3 | 4.2 |
| Porosity, % | 32 | 42 | 47 | 24 |
| Avg. Pore Diameter, A° | 200–600 | 80–90 | 40–50 | — |
| Cross-linkage | 20 | — | — | — |
| Surface Area, M²/g dry | 40–50 | 100–120 | 550–600 | 28 |
| Surface Acid Concentration neq $H^+/m^2$ S.A. | 0.102 | 0.031 | 0.006 | 0.150 |

| | Macroreticular | | | Microreticular |
|---|---|---|---|---|
| | Amberlyst-XN-1008 | Amberlite-200 | Amberlite-XAD-4 | Amberlite-IR-120H |
| Skeletal Structure | Styrene-DVB | Styrene-DVB | Styrene-DVB | Styrene-DVB |
| Ionic Functionality | $RSO_3H$ | $RSO_3H$ | None | $RSO_3H$ |
| Hydrogen Ion Concentration meq/g dry (Exchange Capacity) | 4.5 | 4.3 | 0 | 5.0 |
| Porosity, % | — | — | 52 | 1.8 |
| Avg. Pore Diameter, A° | 400–800 | — | 50 | — |
| Cross-linkage | — | 20 | — | 8 |
| Surface Area, M²/g dry | 30–40 | 40–50 | 750 | <0.1 |
| Surface Acid Concentration meq $H^+/m^2$ S.A. | 0.129 | 0.096 | 0 | >50 |

Surface acid concentration is determined by dividing the exchange capacity by the surface area in the dry state and is reported as milliequivalents of hydrogen ion per square meter surface area. The lower the surface acid concentration of the resin, the more effective is the resin/BF$_3$/HF catalyst for alkylation. In general, the surface acid concentration of the resin should be below about 0.5 milliequivalents of hydrogen ion per square meter surface area and preferably between about 0.001 and about 0.2 milliequivalents of hydrogen ion per square meter surface area.

Neither BF$_3$ alone nor the resin alone is an effective catalyst for the desired isoparaffin/olefin alkylation. Likewise, a resin/BF$_3$ combination containing 1 equivalent of BF$_3$ per equivalent of resin acid groups is also ineffective for alkylation as is a resin/HF combination containing 2.7 equivalents of HF per equivalent of resin acid groups.

The catalyst and more particularly the cation exchange resin component thereof used in accomplishing the desired alkylation is characterized by a water content of between about 0.5 and about 20 weight percent and preferably between about 1.5 and about 15 weight percent. Cation exchange resins having a water content of less than about 0.5 or greater than about 20 weight percent were not found effective in achieving alkylation. Water can be introduced into the resin by contact with the requisite quantity of liquid water or by exposure to a moisture laden atmosphere for a time sufficient to introduce the desired water content. One suitable way of introducing requisite water to the resin is by contacting it with air at 100 percent relative humidity for a controlled period of time.

Alkylation using the described catalyst is carried out at a temperature below that at which the resin decomposes, i.e., generally below 150°C. A temperature as low as −20°C. or lower may be employed. Generally the temperature, under practical operating conditions, will be within the approximate range of −20°C. to 60°C. A particularly effective temperature range is from about −20°C. to 20°C.

The pressure employed is sufficient to maintain the reactants in the liquid state. In general, the pressure will be between about 50 and about 1500 psig and preferably between about 100 and 500 psig.

The isoparaffin reactant used in the present alkylation process is one having from 4 to 8 carbon atoms. Representative examples of such reactant are isobutane, 3 methylhexane, 2 methylbutane, 2,3-dimethylbutane and 2,4-dimethylhexane.

The olefin reactant employed contains from 2 to 12 carbon atoms. Representative examples are butene-2, isobutylene, butene-1, propylene, ethylene, hexene, octene and heptene. Particularly preferred is a C$_4$ olefin, i.e., butene-1, butene-2 or isobutylene either alone or in admixture.

The molar ratio of isoparaffin to olefin is generally between 2 and 50 and more particularly between about 3 and about 10. The weight ratio of resin to total hydrocarbon, that is isoparaffin, olefin and alkylate generally is between about 0.01 and about 0.5 and more particularly between about 0.04 and about 0.2.

The alkylation operation may be carried out either as a batch, semi-batch, continuous or semi-continuous operation. The time of reaction will be governed by the nature of the isoparaffin and olefin reactants employed, the ratio of such reactants, the temperature and pressure conditions utilized and the particular macroreticular resin/BF$_3$/HF catalyst used.

The reactants and the catalyst may be contacted in various ways. Thus, the isoparaffin and olefin reactants may be charged to the reactor as separate streams or they may be premixed before charging to the reactor. The catalyst likewise may be first mixed with the isoparaffin or olefin before introduction into the reactor. Desirably, however, preliminary contact between the catalyst and olefin reactant should be minimized to avoid olefin polymerization. The BF$_3$ and HF components of the catalyst may be premixed with the isoparaffin reactant which are then introduced into the reactor with subsequent addition of the olefin reactant. The BF$_3$ and HF may further be introduced into the reaction zone separately from the introduction of the isoparaffin and olefin reactants. The catalyst may be formed in situ by prior introduction of the macroreticular resin into the reactor followed by addition of BF$_3$ and HF.

As aforenoted, the desired alkylation may be carried out as a batch or semi-batch type operation. In the case of a batch operation, the isoparaffin and olefin reactants are charged to a closed reactor containing the catalyst, which is thereafter maintained at the desired temperature for the desired time. At the conclusion of the reaction, the hydrocarbon product mixture is withdrawn from the reactor and the alkylate product separated from unreacted materials and side products.

The alkylation process of this invention can also be carried out in continuous fashion, in which instance streams of the isoparaffin, the olefins, boron trifluoride and hydrogen fluoride are continuously charged to a reactor containing the macroreticular resin. The reactor is desirably stirred and maintained at the reaction temperature. The reaction mixture product is continuously withdrawn from the reactor, conducted to a vessel wherein BF$_3$ is removed as overhead and recycled to the reactor. The remaining product is conducted to a fractionator in which unreacted isoparaffin is removed as overhead and recycled to the reactor. The desired C$_5$+ alkylate product is withdrawn as bottoms from the fractionator. This product boils in the pentane range and below the maximum temperature usable in gasoline. Generally, the gasoline end point is about 400°F. The alkylate product is usually characterized by a boiling range between that of isopentane and 400°F. A portion of the stream from which BF$_3$ has been removed is conducted to a depropanizer, in which C$_3$ components and HF are removed as overhead and heavier components, removed as bottoms, are recycled to the fractionator. Also, the isoparaffin reactant is suitably removed as a separate stream from the depropanizer and recycled to the reactor. The overhead from the depropanizer containing C$_3$ components and HF is conducted to an HF separation and recovery system and recovered HF is recycled for further use.

A suitable system for carrying out the continuous process is shown in FIG. 1. As will be realized, this described embodiment is schematic in that several items of processing equipment have been omitted for purposes of simplification. Turning to FIG. 1, a stream containing isobutane and butenes along with some normal butane is introduced through line 10 to reactor 11 provided with a stirrer 12. The macroreticular resin has previously been introduced into the reactor. BF$_3$ is introduced from tank 13 through lines 14 and 15 into the reactor. Likewise, HF is introduced from tank 16 through lines 17 and 18 into the reactor. Catalyst slurry is removed from the reactor through outlet 19 and recycled via line 20 to the reactor. The hydrocarbon product mixture is removed from the reactor through line 21 and introduced into $BF_3$ stripper 22, from which $BF_3$ is removed as overhead through line 23 and recycled through line 24 to $BF_3$ tank 13. The remaining product mixture is withdrawn from the $BF_3$ stripper through line 25 and a portion introduced via lines 26, 27 and 28 to fractionator 29. Unreacted isobutane is removed as overhead through line 30 and recycled through line 31 to the reactant feed stream 10. Desired $C_5+$ alkylate product is withdrawn from the bottom of fractionator 29 through line 32. Any normal butane may be withdrawn from the fractionator through line 33. The remaining portion of the hydrocarbon product mixture passing through line 26 from $BF_3$ stripper 22 is conducted through line 34 to depropanizer 35, from which propane and HF are removed as overhead through line 36. Heavier components are removed as bottoms through line 37 and recycled via lines 38 and 28 to fractionator 29. Isobutane is removed from depropanizer 35 through line 39 and recycled through lines 40 and 31 to the initial reactant feed line 10. The propane and HF mixture removed from depropanizer 35 via line 36 is conducted by line 41 to separator 42. The separated HF is removed from separator 42 by line 43 and recycled via lines 44 and 45 to the HF tank 16. The remaining propane from separator 42 is conducted through line 46 to the HF stripper 47 to remove additional HF. The HF is removed from HF stripper 47 via line 48 from which it passes in to separator 49. The separated HF is conducted through lines 50, 51 and 45 to the HF tank 16 from which it is recycled via lines 17 and 18 to feed line 10. The hydrocarbon rich phase is removed from separator 49 via line 52 and passed into HF stripper 47. Propane product is removed from HF stripper 47 via line 53.

DESCRIPTION OF SPECIFIC EMBODIMENTS

The following examples will serve to illustrate the invention without limiting the same.

Experimental results showing the promotional effect hydrogen fluoride has on an inactive Amberlyst XN-1010/$BF_3$ catalyst for isobutane/butene −2 alkylation are shown in Table I below. These experiments were carried out in a 300 ml. stainless steel stirred autoclave under pressure using a semi-batch type operation. In accordance with a standard procedure 7 grams of the resin containing about 6 weight percent of water, 93 grams of isobutane and 1.8 grams of $BF_3$ when present, were initially placed in the reactor and 18 grams of butene −2 were subsequently continuously added over a period of one hour. Hydrogen fluoride, when present, was added to the reactor in an amount of 0.7 gram as a mixture with the isobutane. The course of the alkylation reaction was followed by means of an on-line gas chromatograph using a SCOT PAK column coated with squalane. Product analyses were performed similarly.

TABLE I

| Example | 1 | 2 | 3 | 4 |
| --- | --- | --- | --- | --- |
| Resin | Amberlyst XN-1010 | Amberlyst XN-1010 | Amberlyst XN-1010 | Amberlite XAD-4 |
| Water Content, wt.% | 6 | 6 | 6 | * |
| $BF_3/H^+$(Resin), eq./eq. | 1.3 | 1.3 | 0 | ** |
| $HF/H^+$(Resin), eq./eq. | 0 | 1.6 | 2.7 | ** |
| Cumulative $iC_4/C_4^=$, mol/mol | 5.4 | 5.2 | 5.3 | 4.9 |
| Isobutane/Resin, g/g | 13.3 | 12.8 | 13.2 | 13.3 |
| Olefin WHSV, g olefin/g resin-hour | 2.6 | 2.4 | 2.4 | 2.6 |
| Temp.°C | 2 | 3 | 0 | 1 |
| RESULTS | | | | |
| Olefin Conversion, % | 8 | 93 | trace | trace |
| Product Yield, $gC_5+/gC_4$ | 0.9 | 1.37 | — | — |
| Selectivity | | | | |
| $C_8$ in $C_5+$, wt.% | — | 61 | — | — |
| Trimethylpentanes in Octane Fraction, % | — | 91 | — | — |
| Alkylate Composition, mol % | | | | |
| $C_5$ | — | 5.8 | — | — |
| $C_6$ | — | 4.6 | — | — |
| $C_7$ | — | 3.4 | — | — |
| $C_8$ | — | 61.8 | — | — |
| $C_9$ | — | 9.0 | — | — |
| $C_{10}+$ | — | 15.4 | — | — |

*Water added to reactor to give a resin water content of 8.6 wt.%
**$BF_3$ and HF were added in an amount similar to that used in Example 2. The molar ratio of $BF_3$/HF was 1.

From the above results, it will be seen that Example 1 shows that a catalyst comprised of Amberlyst XN-1010 cation exchange resin containing 6 weight percent water and boron trifluoride in an amount to provide 1.3 equivalents of boron trifluoride per equivalent of resin acid groups is not an effective alkylation catalyst as evidenced by the low olefin conversion and product yield. Example 2 shows that if HF is added in an amount equal to 1.6 equivalents of HF per equivalent of resin acid groups to the Amberlyst XN-1010/$BF_3$ catalyst whose composition is similar to that in Example 1, the new catalytic system is quite active for isoparaffin/olefin alkylation, as evidenced by the high degree of olefin conversion and the improved yield of alkylate. That HF in combination with Amberlyst XN-1010 is not active for alkylation is clear from Example 3 from which it is seen that a catalyst comprised of Amberlyst XN-1010/HF failed to convert a significant amount of the olefin charged to the reaction zone.

The presence of acid groups in the resin is essential for alkylation activity. Such as shown by the results of Example 4. In this example, the levels of water, boron trifluoride and hydrogen fluoride in the reactor closely approximated those present in the system of Example 2; however, the resin employed in Example 4 contained no acidic groups. Without acid groups in the resin, no significant alkylation activity was observed.

It is to be understood that the foregoing description is merely illustrative of preferred embodiments of the invention of which many variations may be made by those skilled in the art within the scope of the following claims without departing from the spirit thereof.

We claim:
1. A process for alkylating an isoparaffin having from 4 to 8 carbon atoms with an olefin containing from 2 to 12 carbon atoms by contacting the same in the liquid state in a reaction zone maintained at a temperature between about −20°C. and 150°C. under conditions such that the molar ratio of said isoparaffin to said olefin is between about 2 and about 50 and in the presence of a catalyst complex comprising a cation exchange resin containing acid groups, boron trifluoride and hydrogen fluoride, said resin consisting essentially of a macroreticular acid cation exchange resin characterized by a water content between about 0.5 and about 20 weight percent and a surface acid concentration of 0.001 to about 0.5 milliequivalents of hydrogen ion per square meter surface area, said boron trifluoride being present in said catalyst complex in an amount of at least about 0.1 equivalent per equivalent of said resin acid groups but not in excess of that required to saturate said resin and said hydrogen fluoride being present in said catalyst complex in an amount between about 0.1 and about 10 equivalents per equivalent of said resin acid groups, withdrawing a hydrocarbon product mixture from said reaction zone and separating an alkylate hydrocarbon product from said mixture.

2. The process of claim 1 wherein said temperature is between about 31 20°C. and 60°C.

3. The process of claim 1 wherein said surface acid concentration is between 0.001 and 0.2 milliequivalents of hydrogen ion per square meter surface area.

4. The process of claim 1 wherein said resin consists essentially of a macroreticular sulfonic acid cation exchange resin.

5. The process of claim 1 wherein the hydrogen fluoride is introduced into said resin in said reaction zone in admixture of said hydrogen fluoride with said isoparaffin.

6. The process of claim 1 wherein said olefin contains 4 carbon atoms.

7. The process of claim 1 wherein said isoparaffin is isobutane.

8. The process of claim 1 wherein said molar ratio of isoparaffin to olefin is between about 3 and about 10.

9. The process of claim 4 wherein said macroreticular sulfonic acid cation exchange resin is a sulfonated styrenedivinylbenzene copolymer.

10. The process of claim 4 wherein said macroreticular sulfonic acid cation exchange resin has a surface area of between about 30 and about 800 square meters per gram.

* * * * *

UNITED STATES PATENT AND TRADEMARK OFFICE
CERTIFICATE OF CORRECTION

PATENT NO. : 3,879,489
DATED : April 22, 1975
INVENTOR(S) : SERGEI YURCHAK and JOSEPH N. MIALE It is certified that error appears in the above-identified patent and that said Letters Patent are hereby corrected as shown below:

Column 8, Claim 2, line 9, "31 20°C." should be -- -20°C. --.

Signed and Sealed this ninth Day of December 1975

[SEAL]

Attest:

RUTH C. MASON
Attesting Officer

C. MARSHALL DANN
Commissioner of Patents and Trademarks